No. 843,646. PATENTED FEB. 12, 1907.
J. F. VOGEL.
CHILD'S HAND CAR.
APPLICATION FILED APR. 23, 1906.
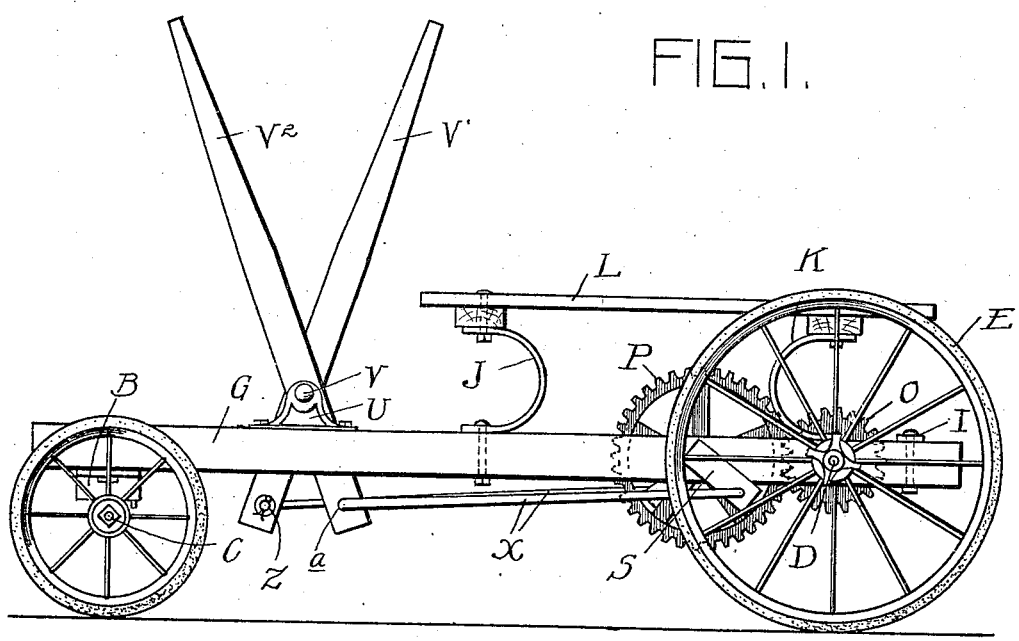
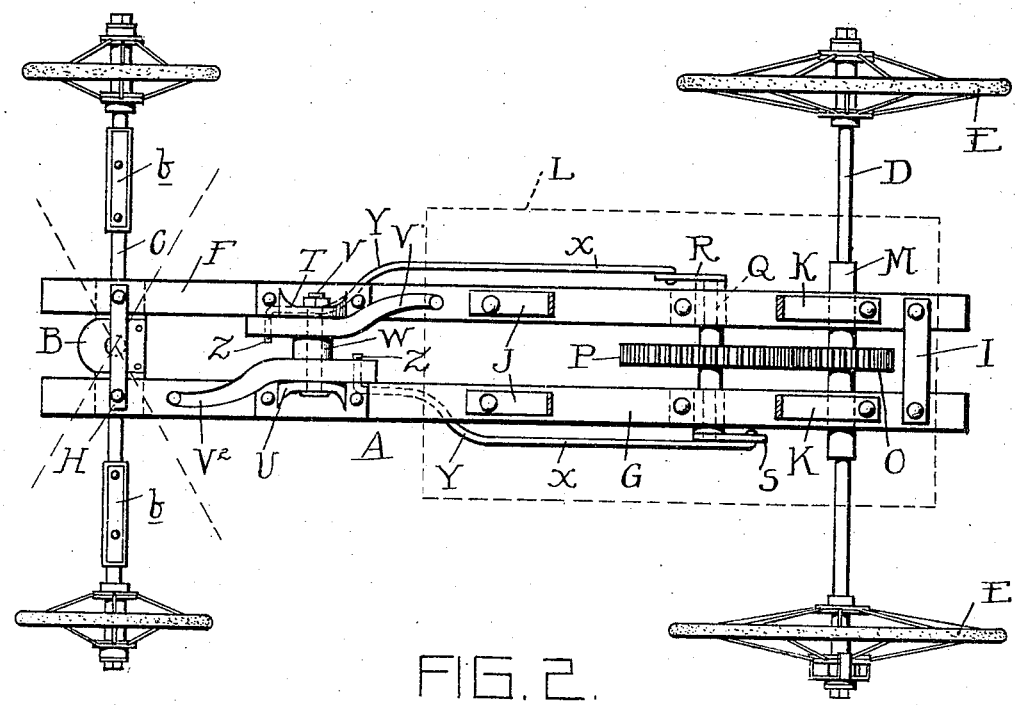
WITNESSES
INVENTOR
JOSHUA F. VOGEL
BY
Whittemore Hulbert & Whittemore
ATTYS.

UNITED STATES PATENT OFFICE.

JOSHUA F. VOGEL, OF TOLEDO, OHIO, ASSIGNOR TO GENDRON WHEEL COMPANY, OF TOLEDO, OHIO, A CORPORATION OF OHIO.

CHILD'S HAND-CAR.

No. 843,646.     Specification of Letters Patent.     Patented Feb. 12, 1907.

Application filed April 23, 1906. Serial No. 313,246.

*To all whom it may concern:*

Be it known that I, JOSHUA F. VOGEL, a citizen of the United States of America, residing at Toledo, in the county of Lucas and State of Ohio, have invented certain new and useful Improvements in Children's Hand-Cars, of which the following is a specification, reference being had therein to the accompanying drawings.

The invention relates particularly to a hand-propelled vehicle or car especially designed for small children; and it consists in the novel and peculiar construction of the car whereby any danger of the feet of the child being cramped or injured during the turning of the front axle is entirely eliminated.

It further consists in the simplicity of construction and in the arrangement and combination of parts, as more fully hereinafter set forth.

In the drawings, Figure 1 is a view in side elevation of the vehicle, and Fig. 2 is a top plan view with the seat removed.

The reference-letter A represents the main supporting-frame mounted at its forward end upon a suitable bolster B, connected to the front wheeled axle C, and at its rear end upon an axle D, one of the wheels E of which is rigidly secured thereto. In construction the main frame is preferably formed of two spaced parallelly-arranged bars or rails F G, tied at their opposite ends by the bars H I and carrying pairs of springs J K, upon which is mounted the seat L.

M represents transverse bearings in the rear of the main frame, in which is journaled the axle D, and O is a gear-wheel fixed upon the rear shaft intermediate the frame-rails. P represents a similar gear meshing with the gear O, mounted upon a stub-shaft Q, journaled in bearings in the frame, the latter shaft carrying the crank-arms R S, arranged in the customary manner in angular relation to one another.

Upon the forward ends of the rails are the oppositely-disposed bearings T U, in which is journaled a stub-shaft V, and V' V² are the hand-operating levers fulcrumed upon the shaft V and spaced one from the other by a suitable sleeve W. These levers, as shown, project through the frame and at a distance below the latter and are connected each to the drive mechanism for the rear axle through the agency of a bar X, secured to the lower projecting end of the lever and to its respective crank-arm on the shaft Q.

To permit of the proper movement of the connecting-bars, each is provided at its forward end with an inwardly-bent section Y and with an offset or lateral free end, as Z, which engages an aperture $a$, formed in the hand-lever for that purpose.

$b$ represents foot-rests on the front axle, on which the feet of the operator are adapted to be placed in steering the vehicle.

It will be obvious from the construction of the operating mechanism described that the operating or hand levers extending through the frame are entirely out of the way of the child's feet, so that all danger of the heels striking the lever or other parts of the mechanism during the turning of the front axle is eliminated. Furthermore, the operating mechanism described is of simple construction and capable of being manufactured at slight cost.

What I claim as my invention is—

1. In a hand-propelled vehicle, the combination with the front and rear wheeled axles, of spaced longitudinal rails thereon comprising a main supporting-frame, complementary hand-levers fulcrumed on the frame intermediate their ends and extending through and below the frame, cranks operatively connected to said rear axle, and drive connections between said levers and said cranks, said drive connections at the forward end being below the rails and entirely between the vertical planes thereof.

2. In a hand-propelled vehicle, the combination with front and rear wheeled axles, of a main supporting-frame thereon composed of spaced parallelly-arranged rails, hand-levers pivoted intermediate their ends between the rails at the forward end of the frame, cranks operatively connected to said rear axle, and drive connections between the lower ends of said levers and said cranks, said drive connections being located entirely between the vertical planes of the rails at the forward end of the frame and extending to without and
5 on opposite sides of said vertical planes near the rear end of said frame, for the purpose described.

In testimony whereof I affix my signature in presence of two witnesses.

JOSHUA F. VOGEL.

Witnesses:
WM. L. DIEMER,
SAM J. NESTER.